United States Patent
Olczak

(10) Patent No.: US 7,876,505 B1
(45) Date of Patent: Jan. 25, 2011

(54) OBJECTIVE LENS SIMULTANEOUSLY OPTIMIZED FOR PUPIL GHOSTING, WAVEFRONT DELIVERY AND PUPIL IMAGING

(75) Inventor: Eugene G Olczak, Pittsford, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 169 days.

(21) Appl. No.: 12/186,671

(22) Filed: Aug. 6, 2008

Related U.S. Application Data

(60) Provisional application No. 61/056,552, filed on May 28, 2008.

(51) Int. Cl.
*G02B 21/02* (2006.01)
*G02B 21/00* (2006.01)

(52) U.S. Cl. ..................... 359/656; 359/370

(58) Field of Classification Search ............. 359/656, 359/660, 722, 723, 362, 370; 356/450
See application file for complete search history.

(56) References Cited

U.S. PATENT DOCUMENTS

| 5,818,632 | A * | 10/1998 | Stephenson | 359/565 |
| 7,336,370 | B1 * | 2/2008 | Olczak et al. | 356/512 |
| 2008/0106696 | A1 * | 5/2008 | Buckland et al. | 351/206 |

* cited by examiner

*Primary Examiner*—Alicia M Harrington
(74) *Attorney, Agent, or Firm*—RatnerPrestia

(57) ABSTRACT

An objective lens includes multiple optical elements disposed between a first end and a second end, each optical element oriented along an optical axis. Each optical surface of the multiple optical elements provides an angle of incidence to a marginal ray that is above a minimum threshold angle. This threshold angle minimizes pupil ghosts that may enter an interferometer. The objective lens also optimizes wavefront delivery and pupil imaging onto an optical surface under test.

18 Claims, 10 Drawing Sheets

OBJECTIVE LENS SIMULTANEOUSLY OPTIMIZED FOR PUPIL GHOSTING, WAVEFRONT DELIVERY AND PUPIL IMAGING

CROSS REFERENCE TO RELATED APPLICATIONS

This application claims priority of U.S. Provisional Patent Application Ser. No. 61/056,552 filed May 28, 2008.

STATEMENT REGARDING FEDERALLY SPONSORED RESEARCH

The invention described herein was made in the performance of work under NASA Contract No. NAS5-02200 and is subject to the provisions of Section 305 of the National Aeronautics and Space Act of 1958 (42 U.S.C. §2457).

FIELD OF THE INVENTION

The invention pertains to optics and, more particularly, to an objective lens and a system and method for using an objective lens.

BACKGROUND OF THE INVENTION

An objective lens, sometimes referred to as a diverger, may be used to transform a collimated beam into a diverging (or converging) beam. In the field of interferometry, an objective lens may be used with an interferometer to address a part under test. The objective lens transforms a collimated beam from the interferometer into a diverging (or converging) beam that fills the numerical aperture of a part under test. The part may be directly addressed, as is typical for a spherical surface, or addressed through a null lens or other apparatus.

SUMMARY OF THE INVENTION

To meet this and other needs, and in view of its purposes, the present invention provides an objective lens including a plurality of optical elements disposed between first and second ends. Each optical element is oriented along an optical axis. Each optical surface of the plurality of optical elements provides an angle of incidence to a marginal ray above a minimum threshold value. The minimum threshold value is approximately 8 degrees.

The angle of incidence is a positive value, and is defined with respect to an intersecting line extending normally from each optical surface of the plurality of optical elements.

Each of the optical surfaces provides an angle of reflection for the marginal rays that is substantially equal to an angle of incidence of the same marginal rays into a corresponding optical surface. The angle of incidence and the angle of reflection are measured with respect to the intersecting line extending normally from the respective optical surface.

The marginal rays are emitted from an exit port of a light source, and are partially reflected from each optical surface at an angle greater than a maximum angle, with respect to the optical axis, for propagating light into an entrance port of an optical measuring system. The entrance port and the exit port are disposed at the same plane, which is oriented perpendicular to the optical axis. The marginal rays are emitted from the exit port of an interferometer, and the light is propagated into the entrance port of the same interferometer.

The partially reflected marginal rays are reflected at an angle of reflection that is greater than the maximum angle for propagating light into the entrance port of the optical measuring system. The maximum angle for propagating light into the entrance port of the optical measuring system is approximately 2 degrees with respect to a marginal ray propagating parallel to the optical axis.

The plurality of optical elements includes first and second doublets disposed between the first and second ends. An air gap is sandwiched between the first and second doublets. The plurality of optical elements is configured to provide a conjugate image of an object at an entrance port of an interferometer. The plurality of optical elements is configured to (a) receive substantially collimated light at the first end, (b) transmit corresponding light from the second end to a device under test to form an image, (c) receive response light from the device under test at the second end, and (d) transmit light from the first end to form an image conjugate corresponding to the image formed at the device under test.

A null lens is disposed along the optical axis, at a location between the second end and a device under test. An interferometer is configured to provide a beam of light along the optical axis toward the first end. An object placed at a distance near infinity, along the optical axis, provides a response light to the second end. The plurality of optical elements is configured to provide, from the first end, a finite conjugate image of the object at an entrance port of an interferometer.

Another embodiment of the present invention is an interferometer providing light, along an optical axis, from an exit port toward an optical device under test, and receiving light along the optical axis at an entrance port. An objective lens and a null lens are disposed along the optical axis between the interferometer and the optical device under test. The objective lens includes an objective back disposed adjacent to the exit port of the interferometer and an objective front disposed adjacent to the null lens. The objective lens includes multiple optical surfaces arranged along the optical axis. Marginal rays of the light is provided from the exit port of the interferometer have an angle of incidence into each of the multiple optical surfaces, with respect to an intersecting line extending normally from each optical surface, that is greater than a minimum threshold value for reducing reflected marginal rays entering the entrance port of the interferometer.

The objective lens is configured to receive a first light from the exit port of the interferometer and focus the first light at a distance away from the objective front. The objective lens is configured to receive a second light from the optical device under test, by way of the null lens. The objective lens is configured to provide the received second light to the entrance port of the interferometer. The first light forms a spot image on an optical surface of the device under test, and the second light forms a conjugate image of the spot at the entrance port of the interferometer. The spot image on the optical surface of the device under test is diffraction limited.

BRIEF DESCRIPTION OF THE FIGURES

The invention may be understood from the following detailed description when read in connection with the following figures.

DETAILED DESCRIPTION OF THE INVENTION

Figure 1A:
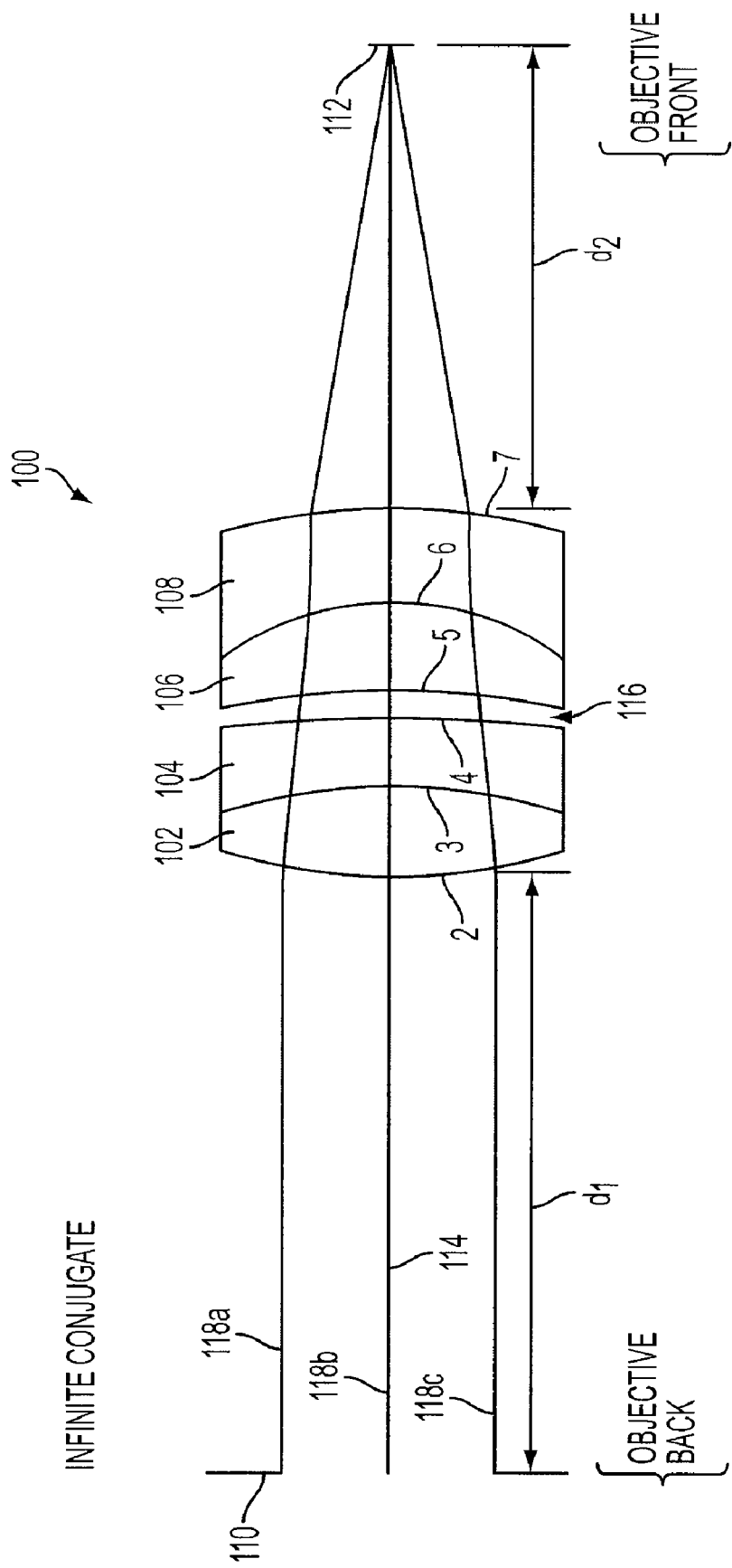
FIG. 1A shows a central and marginal light rays as they pass through an objective lens, in accordance with an embodiment of the present invention.

An objective lens, sometimes referred to as a diverger, may be used to transform a collimated beam into a diverging (or converging) beam. In the field of interferometery, an objective lens may be used with an interferometer to address a part under test. The objective lens transforms a collimated beam from the interferometer into a diverging (or converging) beam that fills the numerical aperture of a part under test. The part may be directly addressed, as is typical for a spherical surface, or addressed through a null lens or other apparatus.

A typical objective lens is optimized to deliver a diffraction limited beam to the device under test. However, an interferometer or any pupil conjugate wavefront sensor must provide a pupil image from incoming light for wavefront evaluation. The imaging performance with respect to the pupil is not optimal in similar prior art devices. For complex modern optical systems, however, the fiducial and optical surface details that are provided by the invention are advantageous. This is especially true, if the system under test includes segmented optical components, such as a segmented primary mirror.

Objective lenses may introduce objectionable back reflections (or "ghosts") at the interferometer. These ghosts may produce visible interference rings in the data that mask and generally degrade the quality of the measurements.

The invention overcomes the limitations of the prior art by providing an objective lens that has diffraction limited optical performance at two sets of conjugates. The first conjugate provides for delivery of a diffraction limited wavefront to a measuring device, for example, in response to a substantially collimated light. The collimated light may be received from the optical output of an interferometer, from a single pass sensor, or from an object at or near infinity, for example. The second conjugate provides high resolution of a device or a part under test in the plane of evaluation of the wavefront sensing instrument, for example. In addition, the present invention reduces the impact of first reflection ghosts at an interferometer pupil.

In addition to the above, the system may be optimized for finite conjugate imaging of a mirror under test to the interferometer (aperture stop at the front focus of the objective) and infinite object beam delivery (aperture stop at the back focus of the objective lens).

This invention differs from that disclosed in application Ser. No. 11/948,508 (Pupil Imaging Objective Lens) in that resolution is not pushed to as high level though still much improved compared to a lens with no optimization. The invention also includes the important anti ghosting feature. application Ser. No. 11/948,508 is incorporated herein by reference in its entirety.

As will be explained, for each surface in the objective lens, the absolute value of the angle of incidence of the marginal rays is maintained above a minimum threshold (this may be adjusted on a surface by surface basis) for the infinite image conjugate. In an exemplary embodiment, the minimum angle is approximately 8-9 degrees for all surfaces (that is, 8-9 degrees with respect to a normal line to the surface of each lens). This has the effect of producing divergent and out of focus reflections (that is, reflections of 8-9 degrees with respect to the normal line from the surface of each lens; or 16-18 degrees with respect to the angle of incidence of the marginal ray).

The reflections from each surface of the lens result in low intensities at the entrance to the interferometer. The bulk of the reflections propagate at angles relative to the optical axis such that only a small core of each reflection may reach the sensor without obstruction (at an internal interferometer stop). In an exemplary embodiment, the maximum angle, with respect to the optical axis, that may propagate inside the interferometer and reach the sensor is approximately 2 degrees. These effects (plus antireflection coatings) contribute to achieving faint reflections at the interferometer sensor.

The present invention may be used with all commercial interferometers to reduce reflections from the objective lens into the interferometer sensor.

An exemplary objective lens 100 is described with reference to FIG. 1A. The exemplary objective lens 100 includes a plurality of optical lenses positioned along optical axis 114. The optical lenses are designated in sequence from the back of objective lens 100 (defined as an end closer to aperture stop 110) to the front of objective lens 100 (defined as an end closer to focal surface 112), namely, lenses 102, 104, 106 and 108. An air gap, designated as 116, is formed between lenses 104 and 106.

Lenses 102 and 104 form a first doublet of the present invention and lenses 106 and 108 form a second doublet of the present invention. The first doublet includes three surfaces designated as 2, 3 and 4; the second doublet includes three other surfaces designated as 5, 6 and 7. The surfaces 3 and 6 may be formed by gluing (for example) lens 102 to lens 104 and lens 106 to lens 108, respectively.

As shown in FIG. 1A, objective lens 100 may be optimized for delivering an infinite conjugate. Three rays of light 118a, b and c are shown entering the back of objective lens 100, which are focused to pass through a conjugate point on focal surface 112 at the front of the objective lens. The three rays of light, emitted from an infinite point (not shown), become paraxial rays upon passing through aperture stop 110, because they are substantially parallel to optical axis 114.

In the exemplary embodiment, the optical elements 102, 104, 106 and 108 are made of glass. The invention encompasses, however, optical elements that are reflective and optical elements that are made of materials other than glass. For example, the optical elements may include polycarbonate, zinc selenide (ZnSe), and silicon for refractors, and aluminum, copper and beryllium for mirrors.

A first surface 110, which is also referred to herein as aperture stop 110 (approximately co-located, for example, at an interferometer entrance port), may be positioned behind the optical elements of objective lens 100. The stop 110 is positioned a distance d1 (i.e., the back focal distance) behind optical element 102 in this exemplary embodiment. A focal surface 112 is located a distance d2 in front of objective lens 100. The image field of objective lens 100 corresponds to the pupil size to be imaged.

Figure 1B:
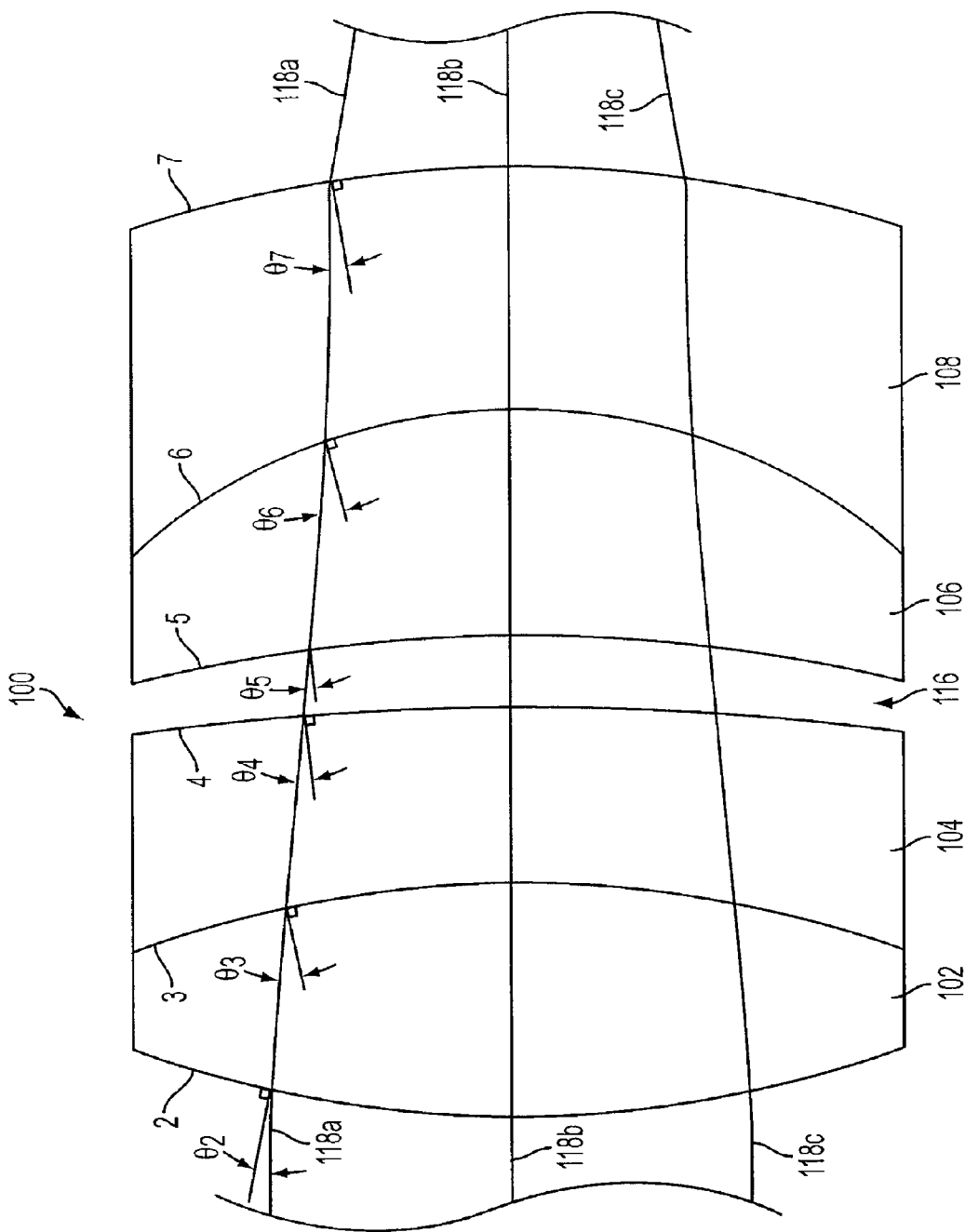
FIG. 1B shows marginal rays passing sequentially, at an angle of incidence, through each of the surfaces of the objective lens of FIG. 1, in accordance with an embodiment of the present invention.

Referring next to FIG. 1B, objective lens 100 is shown in greater detail. Three rays of light are shown arriving from an interferometer (not shown). The central, or axial ray is designated as 118b and the two marginal rays are designated as 118a and 118c. The marginal rays enter each lens surface, as shown from left to right, forming angles of theta2, theta3, theta4, theta5, theta6 and theta7, with respect to a normal line extending from each respective lens surface. These angles are referred to herein as angles of incidence.

The present invention is configured to provide an angle of incidence to the marginal rays of light that is greater than a minimum threshold. This minimum threshold may be, for example, 8-9 degrees. The angle of incidence is always positive.

Although not shown in FIG. 1B (but explained later with respect to FIG. 8), reflection angles from each surface 2-7 are equal to the angles of incidence to each surface 2-7. Thus, if the angles of incidence are each at a minimum of 8-9 degrees than the angles of reflection are each at a minimum of 8-9 degrees with respect to a normal line extending from each lens surface. This, of course, is a result of the Law of Reflection. The angles formed between a marginal ray of incidence and a marginal ray of reflection is twice the angle of incidence or the angle of reflection, namely, a minimum threshold of 16-18 degrees.

Since these angles are much greater than the angle for illumination that may propagate inside an interferometer to reach the sensor, namely approximately 2 degrees with respect to the optical axis, the present invention is effective in reducing ghost reflections from the objective lens into the interferometer entrance port.

In this example, the F number (the ratio of the focal length divided by the entrance pupil diameter) of the objective lens is 3. As such, the marginal rays have an angle of incidence greater than 9 degrees at the objective lens front focus (with respect to the optical axis). Thus, this example shows that the ghost reflections are well managed, if the threshold angle is greater than 0.8 times the marginal ray angle at the objective lens front focus. In other words, the threshold angle should be greater than 0.8 times the inverse sine of the numerical aperture of the objective lens.

Figure 2:
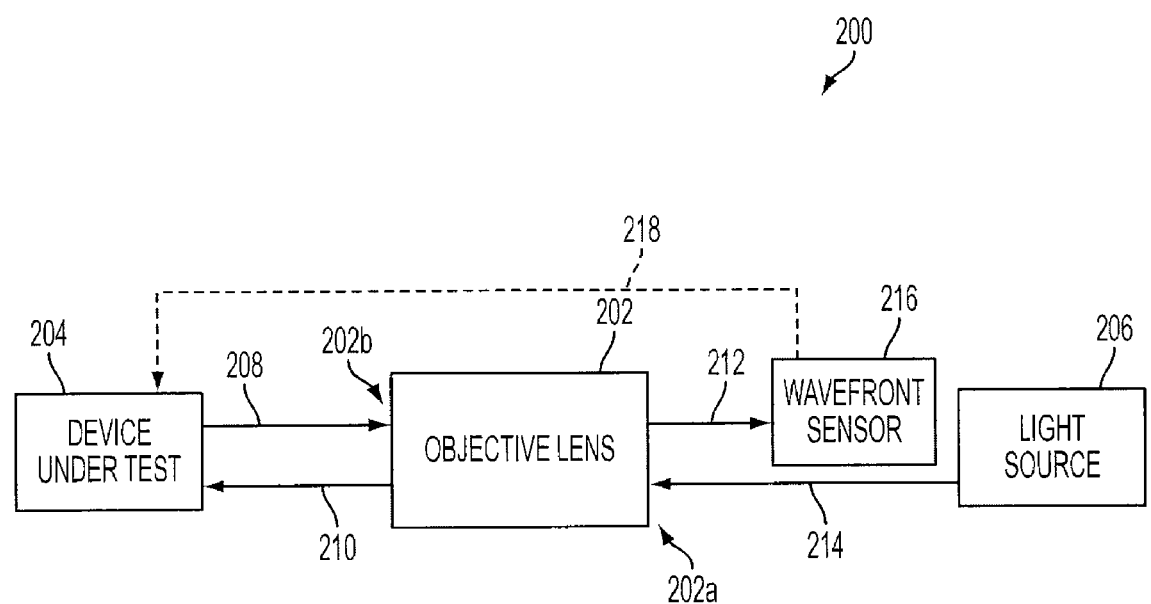
FIG. 2 shows a block diagram of a wavefront measuring system in accordance with an embodiment of the present invention.

A block diagram of an exemplary system 200 for directing light to a device under test is shown in FIG. 2. The system 200 includes objective lens 202 according to an exemplary embodiment of the invention. The objective lens 202 has a first end 202a for receiving light beam 214 from light source 206. The objective lens 202 directs a corresponding light beam 210 out from its second end 202b to the device under test 204. Exemplary embodiments of device 204 may be a mirror, an assembly of mirrors, deformable mirrors, a telescope, an optical assembly to be aligned, or any combination thereof. The light 208 returned from device 204 is received at second end 202b of objective lens 202.

The objective lens 202 directs the corresponding light 212 from its first end. As shown in FIG. 2, light 212 is not necessarily directed back to light source 206. In the exemplary embodiment of FIG. 2, light 212 is directed to wavefront sensor 216 (may also be processor 216). Such wavefront sensor 216 may be an optical pattern recognition device or an interferometer, for example.

In an exemplary embodiment, wavefront processor 216 processes returned light 212 received from objective lens 202 to characterize device 204 under test. For example, wavefront processor 216 may process returned light 212 to identify surface details of the device under test. In an exemplary embodiment, the device under test may be a segmented mirror, including a plurality of mirror segments, and wavefront sensor 216 may be used to provide information regarding the orientation of the mirror segments. The orientation information may be fed back (feedback path 218 shown in phantom in FIG. 2) to device 204 for correcting or adjusting the orientation of the mirror segments, in response to the identified surface details.

Exemplary embodiments of the invention may include light 212 directed to the same unit that provides the source of light. For example, source light 214 may be provided by an interferometer, and light 212 directed from first end 202a of objective lens 202 may be directed back to the interferometer.

Figure 3A:
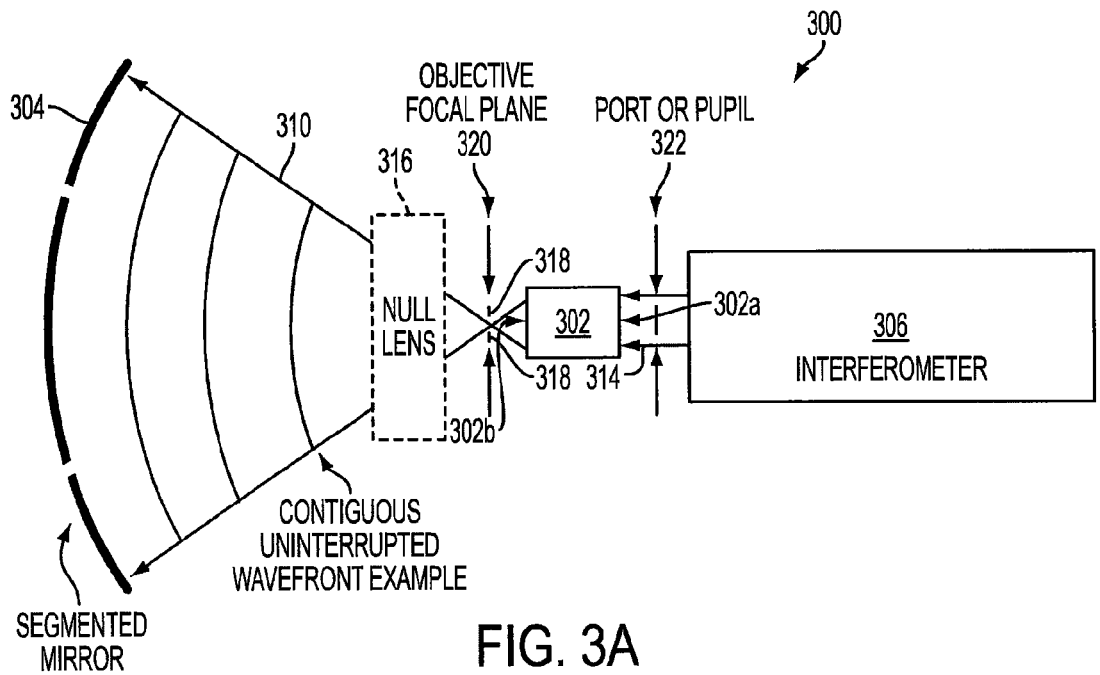
FIGS. 3A and 3B illustrate the forward and return light paths, respectively, in a wavefront measuring system, according to an exemplary embodiment of the present invention.
Figure 3B:
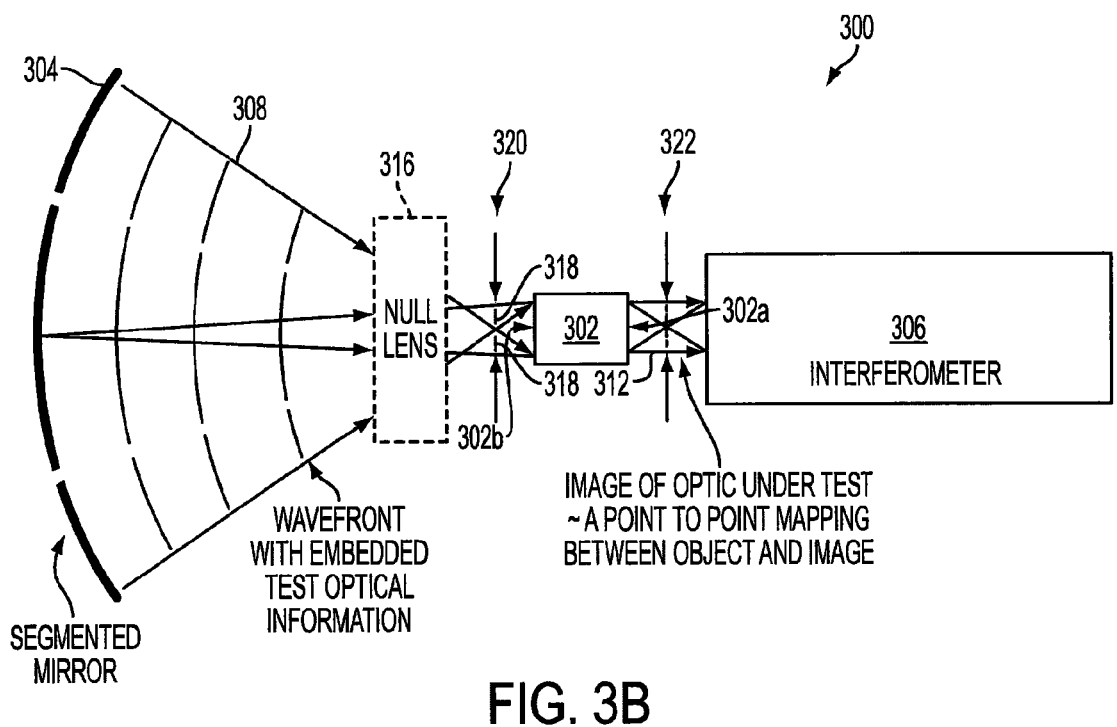

Another exemplary system, designated as 300, for directing light to a device under test, is shown in FIGS. 3A and 3B. The forward light path is illustrated in FIG. 3A and the return light path is illustrated in FIG. 3B. The system 300 includes objective lens 302, according to an exemplary embodiment of the invention, interferometer 306 and device under test 304. The device under test in this exemplary embodiment is a segmented mirror. The objective lens 302 directs light received from interferometer 306 to segmented mirror 304 and directs light returned from segmented mirror 304 back to interferometer 306.

With reference to FIG. 3A, objective lens 302 receives light 314 from interferometer 306 at first end 302a of objective lens 302. The objective lens 302 directs corresponding light 310 from second end 302b to segmented mirror 304. In an exemplary embodiment, system 300 may optionally include a nulling device 316, or null lens 316, as shown in phantom in FIGS. 3A and 3B. In an exemplary embodiment, nulling device 316 is a nulling apparatus as described in U.S. Pat. No. 7,336,370, titled "Optical Nulling Apparatus and Method For Testing an Optical Surface" (issued Feb. 26, 2008), which is hereby incorporated by reference in its entirety.

The nulling device 316 receives light from second end 302b of objective lens 302 and directs such light 310 to the device under test 304. In addition, the nulling device receives light 308 returning form device 304 and directs such light to second end 302b of objective lens 302.

With reference to FIG. 3B, light 308, which is returned from the device under test 304, is received at second end 302b of objective lens 302. The objective lens 302 directs corresponding light 312 from its first end to form a pupil image at 322, which is seen by interferometer 306. The entrance port of interferometer 306 is designated as 322. The objective focal plane of objective lens 302 is designated as 320. The entrance port of interferometer 306 is also referred to as the objective back of objective lens 302. The objective focal plane of objective lens 302 is referred to as the objective front (as shown in FIG. 1A).

The objective lens 302 of system 300 propagates light 308 backwards from the device under test 304 to entrance pupil 322 of interferometer 306. In an exemplary embodiment, system 300 includes field stop 318, which may be placed at objective focal plane 320. The field stop 318 may act as an aperture stop for the pupil image.

In an exemplary embodiment, objective lens 302 of system 300, as shown in FIGS. 3A and 3B, has an image entrance pupil diameter of 7 mm and includes the two doublets shown in FIGS. 1A and 1B. The entrance pupil diameter value may be chosen to match the entrance pupil size of interferometer 306. The exemplary system 300 may be configured at F/3 and may be used in a center of curvature test that employs null lens 316 and interferometer 306, with a wavelength of 680 nm (ranging from 660-687 nm). The dimensions, thicknesses, and spacing of the optical elements for an exemplary objective lens 300 are shown in Table 1 below.

TABLE 1

Example of System/Prescription Data

| Surface | Type | Radius | Thickness | Glass | Diameter | Conic |
|---|---|---|---|---|---|---|
| Object | Standard | Infinity | Infinity | | 0 | 0 |
| Stop | Standard | Infinity | 19.49165 | | 7 | 0 |
| 2 | Standard | 18.77147 | 2.953859 | N-LAK33 | 11 | 0 |
| 3 | Standard | −17.59841 | 2.270808 | F15 | 11 | 0 |
| 4 | Standard | −60.26598 | 0.879023 | | 11 | 0 |
| 5 | Standard | −25.15344 | 2.999994 | PSK54 | 11 | 0 |
| 6 | Standard | −8.743229 | 3.000074 | SF6HT | 11 | 0 |
| 7 | Standard | −20.82666 | 15.25284 | | 11 | 0 |
| Image | Standard | Infinity | | | 1.5 | 0 |

With reference to Table 1, the back surface of lens element 102 in FIG. 1A corresponds to surface 2 with a radius of 18.77147 mm, a thickness of 2.953859 mm between surfaces 2 and 3, and a diameter of 11 mm. The joint between element 102 and 104 corresponds to surface 3 in Table 1, having a radius of −17.59841 mm, a thickness of 2.270808 mm between surfaces 3 and 4, and a diameter of 11 mm. The dimensions and spacing of the other optical elements 106 and 108 may similarly be determined, based on the exemplary configuration specified in Table 1.

It will be appreciated that the optical data, shown in Table 1, provide the radius of each of surfaces 2, 3, 4, 5, 6 and 7 (diagrammed in FIGS. 1A and 1B). Surface 2 has a positive radius (convex surface) and each of the other surfaces has a negative radius (concave surface). The thickness dimensions is the distance in mm, between the surface involved and the next surface. Accordingly, for example, the thickness 0.879023 mm for surface 4 is the distance in air gap 116 between surface 4 and surface 5.

Furthermore, the distance, 15.25284 mm, of surface 7 is the distance between surface 7 and focal surface 112, namely distance d2 (or the front focal distance).

Moreover, the distance of 19.49165 mm, shown for the stop surface is the distance between stop aperture 110 and surface 2, namely distance d1 (or the back distance to the entrance port of the interferometer). The stop aperture 110 has a diameter of 7 mm.

Lastly, the optical elements each have a diameter of 11 mm. The focal surface 112 has an image diameter of 1.5 mm. Also shown in Table 1 are the various types of glass used for each surface.

Figure 4:
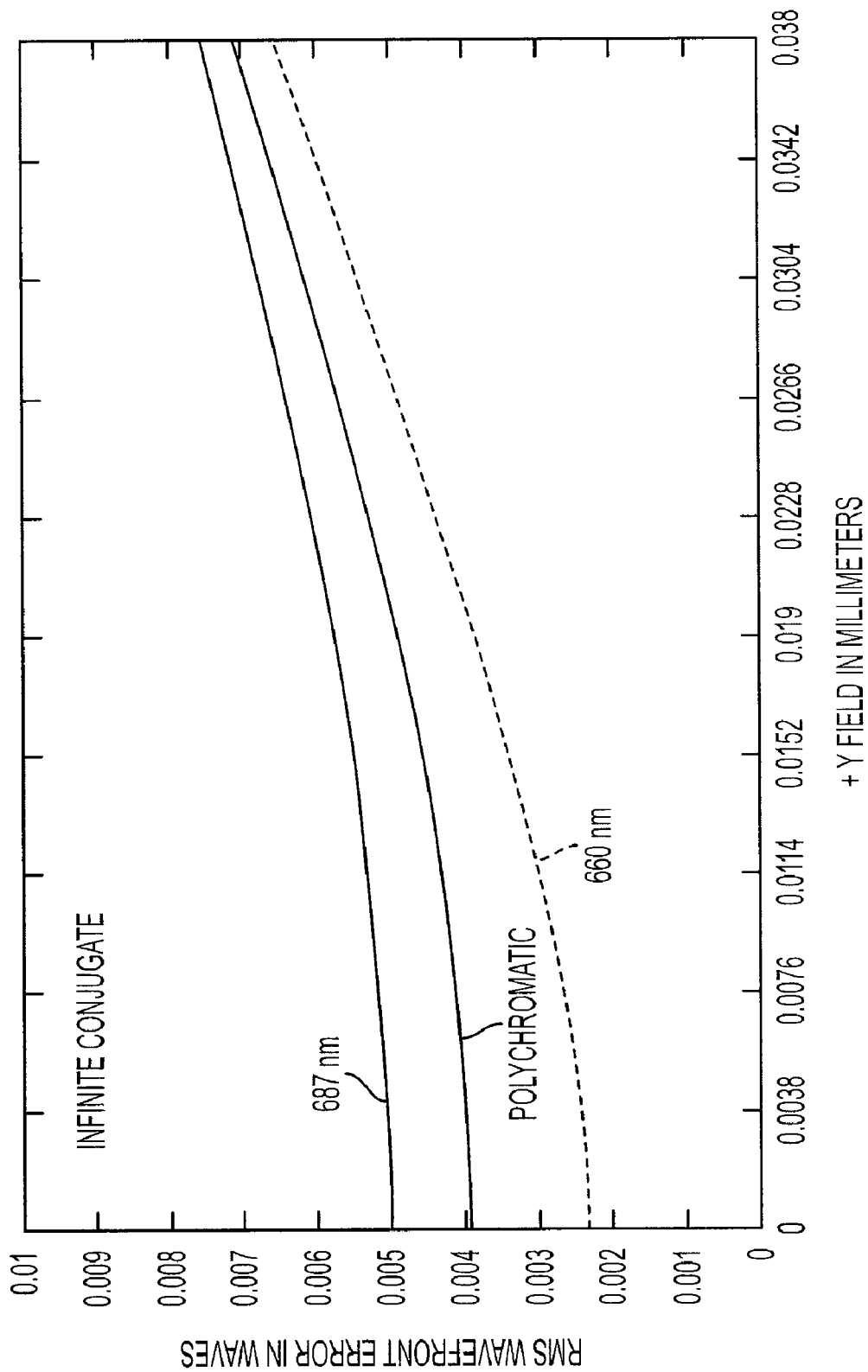
FIG. 4 is a plot of root mean square (RMS) wavefront error for a wavefront measuring system according to an exemplary embodiment of the present invention.

FIG. 4 depicts the wavefront performance for objective lens 100 shown in FIGS. 1A and 1B, operating with an optic under test positioned at infinity. The plots of RMS wavefront errors illustrates that the objective lens is well corrected, with less than one hundredth (1/100) wave RMS wavefront error at the edge of the field (using a wavelength of light for which the lens is designed). In an exemplary embodiment, the objective lens 100 is configured to produce diffraction limited spots, where the RMS wavefront error is less than about one tenth (1/10) of a wave in the field of the lens. As used in relation to this exemplary embodiment, the term "field" may be defined as an area or extent of the object to be imaged by the objective lens, or as the area or extent of the image that is produced by the objective lens.

An advantage of an objective lens according to an exemplary embodiment of the invention may be understood by considering that the pupil image of system 300 in FIGS. 3A and 3B is propagated backwards from the device under test 304 (e.g., a segmented mirror) to entrance pupil 322 of interferometer 306. In an exemplary embodiment, field stop 318 placed at focal surface 320 may act as the aperture spot for the pupil image. Although optic under test 304 is not typically at infinity, it is typically at a distance that is large compared to the focal length of objective lens 302. It will be appreciated that a similar field stop is focal plane 112 shown in FIG. 1A.

Figure 5:
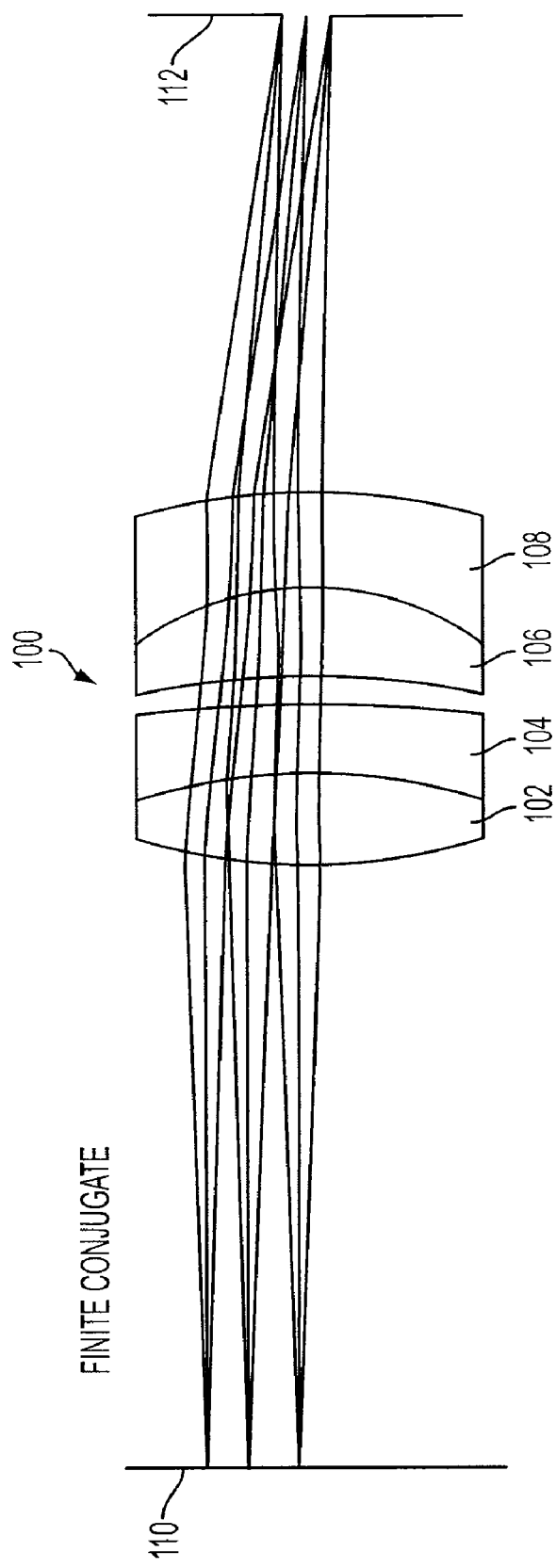
FIG. 5 illustrates an objective lens according to another exemplary embodiment of the present invention.

Referring next to FIG. 5, the same objective lens 100 is shown operating as a finite conjugate. As shown, objective lens 100 is optimized for delivering a finite conjugate image of device under test 304 (FIG. 3B, for example) to stop aperture 110. The rays of light are shown entering the back of objective lens 100 which are then focused to pass through a conjugate point on focal plane 112, at the front of the objective lens. In reverse, the rays may be assumed to pass through focal plane 112 and next enter stop aperture 110, as they arrive from a device under test, such as a segmented mirror. Since the segmented mirror is not at infinity, the rays passing through objective lens 100 are not focused at one single point on focal plane 112, as they were in FIG. 1A. The rays are, however, diffracted, or otherwise scattered toward focal plane 112 to fill an image of the interferometer stop that has a diameter of approximately 1.5 mm at this surface, as shown in Table 1. It will be appreciated that focal plane 112 may include the image spot returned from a device under test that eventually forms the pupil image at entrance port 322 of interferometer 306, shown in FIGS. 3A and 3B.

Figure 6:
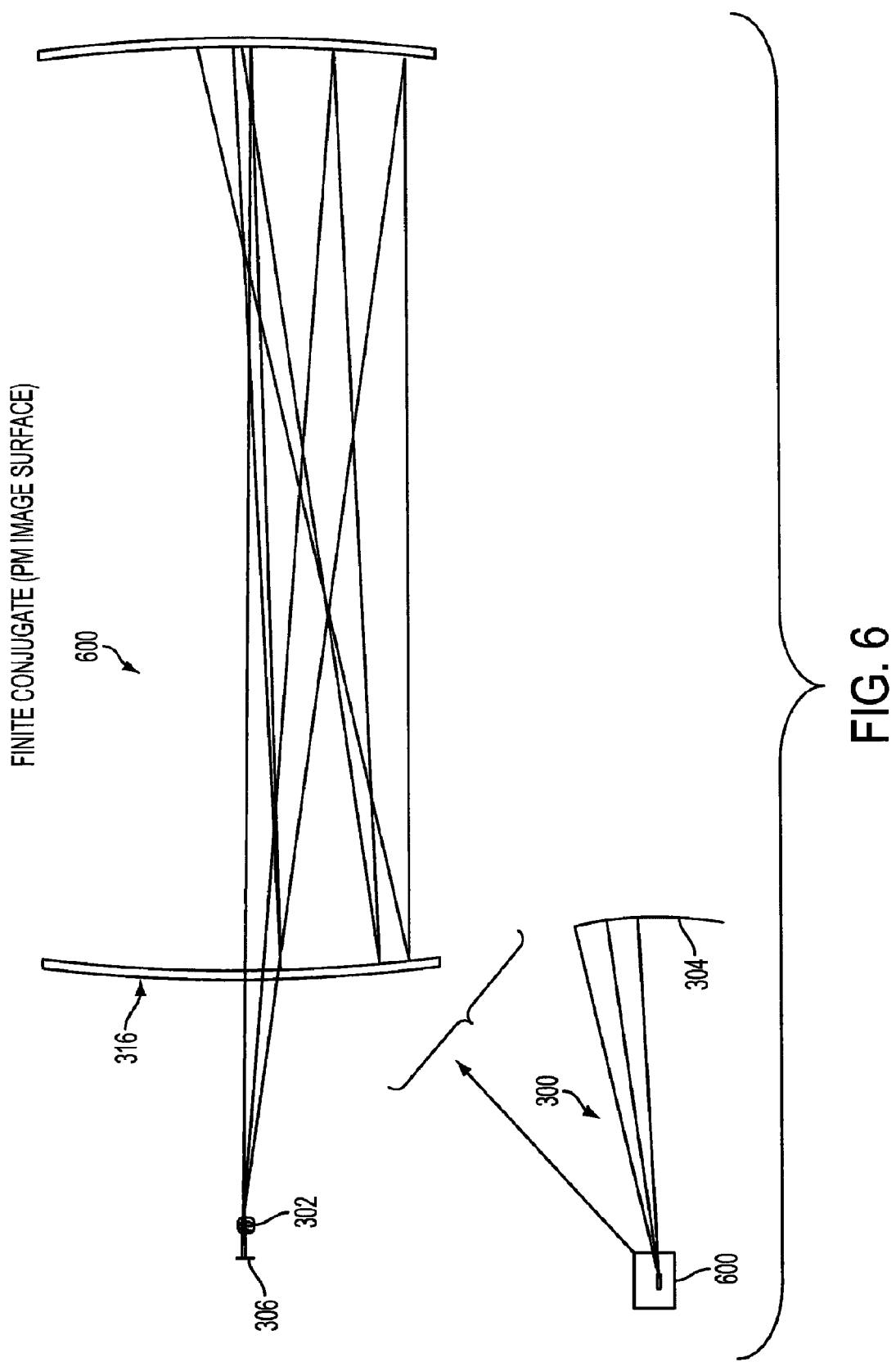
FIG. 6 illustrates light rays emitted from a light source and passing through a nulling device, toward a mirror surface under test, in accordance with an embodiment of the present invention.

Referring next to FIG. 6, operation of objective lens 302 is shown as forming a finite conjugate at focal plane 112 (FIG. 5) for the rays transmitted to a mirror surface under test, such as primary mirror 304 (also shown in FIG. 3A). The small sketch in the bottom, left portion of FIG. 6 depicts system 300 including primary mirror 304. The portion 600 represents the interferometer, the objective lens and the null lens shown in FIGS. 3A and 3B.

An expanded view of portion 600 is shown at the upper, right portion of FIG. 6. As shown, rays of light are emitted from interferometer 306 to pass through objective lens 302 and null lens 316. The rays, after propagating through null lens 316, form a spot image on primary mirror surface 304. Thus, objective lens 302 (or objective lens 100) may be used to deliver a spot image to a device under test, such as primary mirror 304. In the present invention, an optical source spot is delivered through focal plane 112, which produces a diffraction limited spot on the surface under test. In reverse, a spot on the primary mirror surface is reflected back through the null lens to deliver a spot at focal plane 112 of objective lens 100. The spot is focused, as shown in FIG. 1A, or may be accompanied by scattered light to fill the aperture, as shown in FIG. 5. From focal plane 112, the spot passes through objective lens 100 toward the entrance port 110 of an interferometer.

Figure 7:
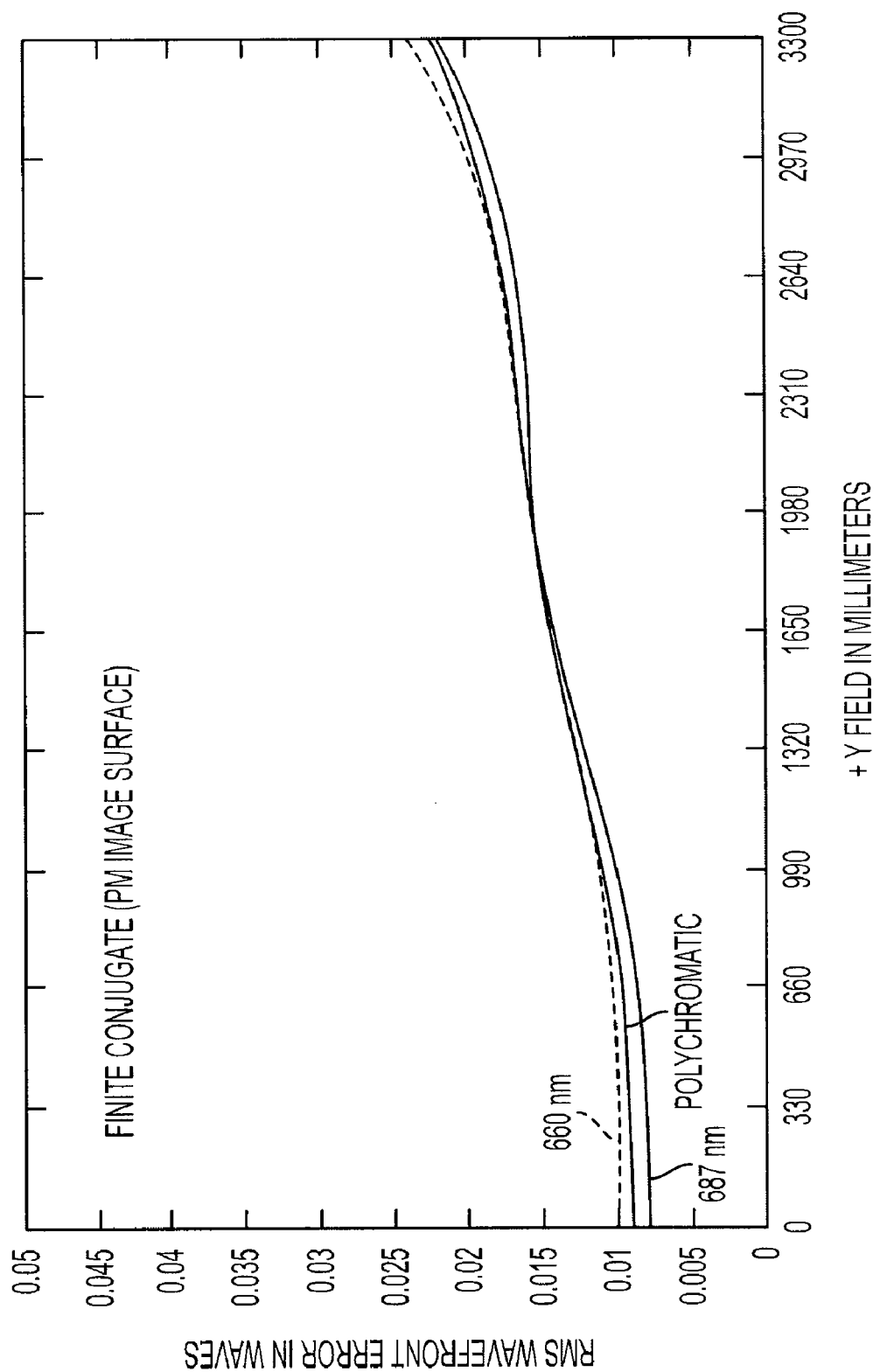
FIG. 7 is another plot of RMS wavefront error for a wavefront measuring system according to an exemplary embodiment of the present invention.

FIG. 7 shows plots of the RMS wavefront error in waves versus the Y field in millimeters, the latter representing the distance from the center of the optical axis to the edge of the image impinged on the PM surface. These plots illustrate that the objective lens is well corrected with RMS wavefront errors at the edge of the field being less than 0.025 waves.

Figure 8A:
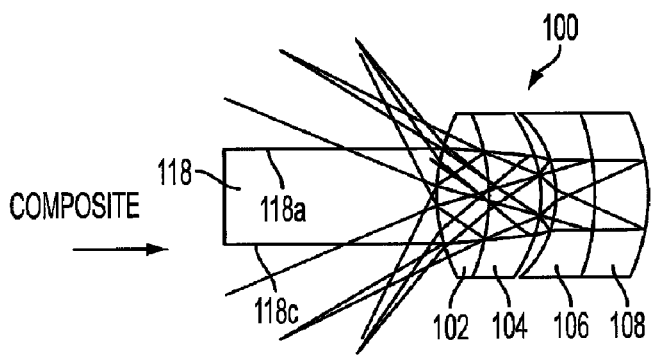
FIG. 8A is an illustration of marginal rays as they enter the objective lens of FIG. 1A and are, respectively, reflected from each of the surfaces of the objective lens, in accordance with an embodiment of the present invention.

Referring next to FIGS. 8A through 8G, single bounce ghost reflections are shown for objective lens 100. As described above, the present invention provides an objective lens that reflects a marginal ray entering any surface of the objective lens by at least approximately 8-9 degrees. FIG. 8A is a composite of light rays 118, including marginal rays 118a and 118c entering objective lens 100 and impinging upon all its surfaces designated by 2, 3, 4, 5, 6 and 7. The rays 118 enter from left to right, or from the objective back to the is objective front (FIG. 1A), namely from surface 2 toward surface 7. As shown, all the reflected rays from the surfaces, shown returning to the objective back, provide a reflection angle that is greater than 8-9 degrees with respect to a normal line extending from any respective reflection surface.

Figure 8B:
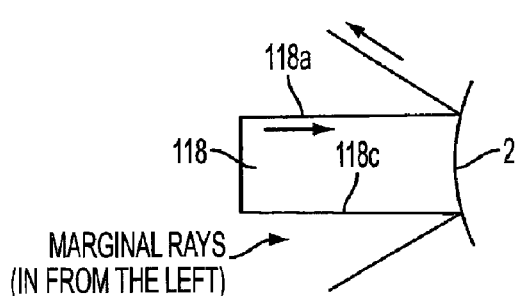
FIGS. 8B through 8G are illustrations of the same marginal rays shown in FIG. 8A, reflected individually from each surface of the objective lens.
Figure 8C:
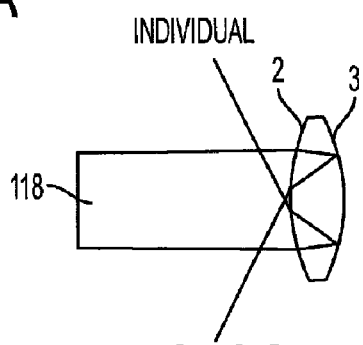
Figure 8D:
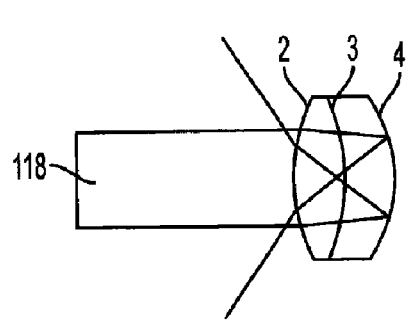

FIG. 8B shows surface 2 reflecting marginal rays 118a and 118c. Surface 2 reflects the marginal rays by more than 8-9 degrees. FIG. 8C shows a reflection from surface 3. As shown, marginal rays 118a and 118c pass through surface 2, next reflected from surface 3, and then transmitted through surface 2. This reflection is also greater than the minimum threshold of 8-9 degrees. Similarly, FIG. 8D shows a reflection from surface 4. As shown, marginal rays 118a and 118c pass through surfaces 2 and 3, and then are reflected from surface 4 toward the objective back of the lens. This reflection is also greater than the minimum threshold of 8-9 degrees.

Figure 8E:
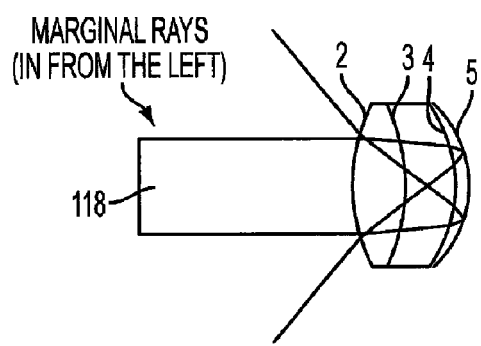
Figure 8F:
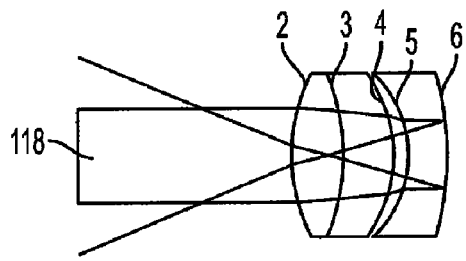
Figure 8G:
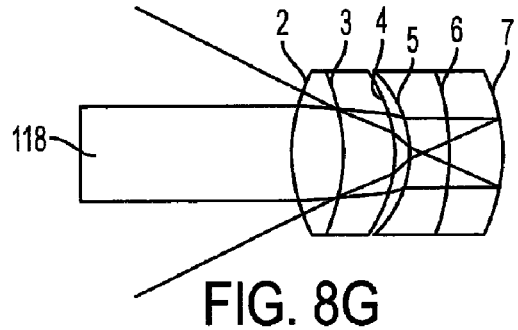

In a similar manner, FIGS. 8E, 8F and 8G show, respectively, reflections from surfaces 5, 6 and 7. All these surfaces provide reflections that are greater than the minimum threshold value of 8-9 degrees. None of these reflected rays can enter entrance port 110 (FIG. 1A) of an interferometer. Accordingly, the present invention reduces or eliminates ghosts that are reflected back from the objective lens into a wavefront measuring device.

Table 2 is another exemplary configuration of objective lens 100 including types of glass, and dimensional sizes for radius, thickness and diameter. Table 2 includes six surfaces, identified as 2 through 7, which correspond to surfaces 2-7 shown in FIG. 1A.

TABLE 2

Another Example of System/Prescription Data

| Surface | Type | Radius | Thickness | Glass | Diameter | Conic |
|---|---|---|---|---|---|---|
| Object | Standard | Infinity | Infinity | | 0 | 0 |
| Stop | Standard | Infinity | 15.64 | | 7 | 0 |
| 2 | Standard | 12.99259 | 3.94 | S-BSL7 | 12 | 0 |
| 3 | Standard | −12.99259 | 3.6 | S-BSM2 | 12 | 0 |
| 4 | Standard | −10.50951 | 1.09 | | 12 | 0 |
| 5 | Standard | −7.982652 | 2.83 | S-TIH53 | 12 | 0 |
| 6 | Standard | −18.11748 | 4 | S-BSM2 | 12 | 0 |
| 7 | Standard | −12.50354 | 14.93687 | | 12 | 0 |
| Image | Standard | Infinity | | | 1.5 | 0 |

Figure 9A:
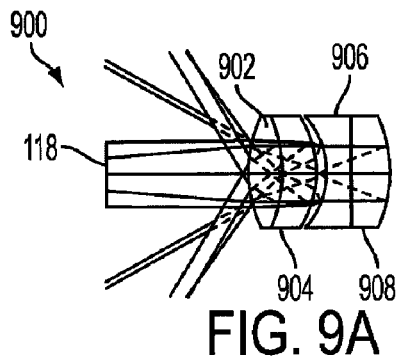
FIGS. 9A through 9G are illustrations of marginal rays as they enter another objective lens (different from FIG. 1A) and are, respectively, reflected from each of the surfaces of the objective lens, where one of the surfaces does not provide the advantages of the present invention.

Referring next to FIGS. 9A through 9G, single bounce ghost reflections are shown for objective lens 900. As described above, the present invention provides an objective lens that reflects a marginal ray entering any surface of the objective lens by at least approximately 8-9 degrees. FIG. 9A, however, violates this rule. As shown, marginal rays 118a and 118c enter objective lens 900 (including doublet 902 and 904; and doublet 906 and 908) and impinge upon all its surfaces designated by 2, 3, 4, 5, 6 and 7. The rays 118 enter from left to right, or from the objective back to the objective front, namely from surface 2 toward surface 7. As shown, most of the reflected rays from the surfaces, shown returning to the objective back, provide a reflection angle that is greater than 8-9 degrees with respect to a normal line extending from any respective reflection surface. The exception to this rule, however, is surface 6. This may be seen more clearly by examining FIGS. 9B through 9G.

Figure 9B:
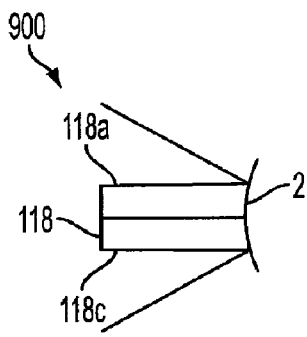
Figure 9C:
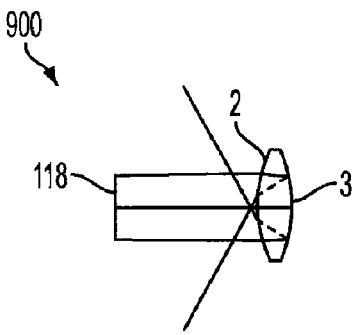
Figure 9D:
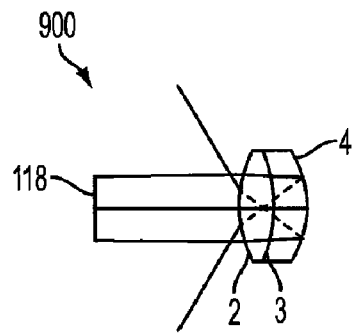

FIG. 9B shows surface 2 reflecting marginal rays 118a and 118c. Surface 2 reflects the marginal rays by more than 8-9 degrees. FIG. 9C shows a reflection from surface 3. As shown, marginal rays 118a and 118c pass through surface 2, next reflected from surface 3, and then transmitted through surface 2. This reflection is also greater than the minimum threshold of 8-9 degrees. Similarly, FIG. 9D shows a reflection from surface 4. As shown, marginal rays 118a and 118c pass through surfaces 2 and 3, and then are reflected from surface 4 toward the objective back of the lens. This reflection is also greater than the minimum threshold of 8-9 degrees.

Figure 9E:
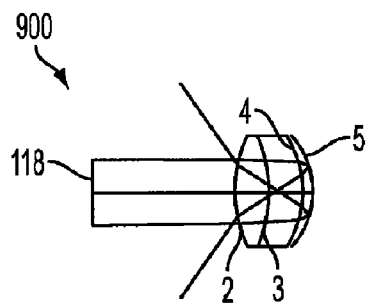
Figure 9F:
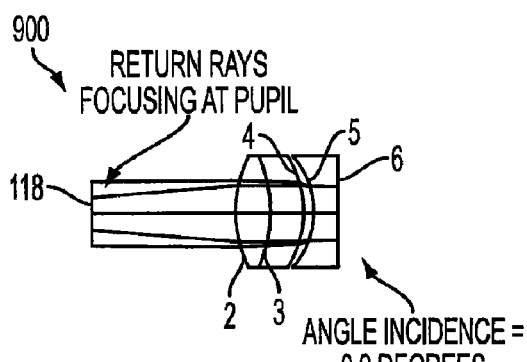
Figure 9G:
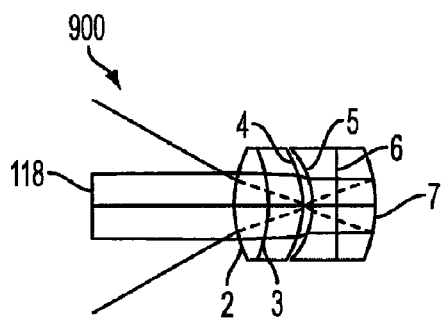

In a similar manner, FIGS. 9E and 9G show, respectively, reflections from surfaces 5 and 7. All these surfaces provide reflections that are greater than the minimum threshold value of 8-9 degrees. None of these reflected rays can enter entrance port 110 (FIG. 1A, for example) of an interferometer. FIG. 9F, however, shows surface 6 providing reflected rays that focus at the pupil, or entrance port of the interferometer. The angle of incidence at surface 6 is 0.9 degrees. Accordingly, lens 900 does not eliminate ghosts that are reflected back from the objective lens into a wavefront measuring device.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An objective lens comprising
   a plurality of optical elements disposed between a first end and a second end, and
   each optical element oriented along an optical axis,
   wherein each optical surface of the plurality of optical elements provides an angle of incidence to a marginal ray above a minimum threshold value, and
   wherein the marginal rays are emitted from an exit port of a light source, and
   the marginal rays are partially reflected from each optical surface at an angle greater than a maximum angle, with respect to the optical axis, for propagating light into an entrance port of an optical measuring system.

2. The objective lens of claim 1 wherein
   the minimum threshold value is approximately 8 degrees.

3. The objective lens of claim 1 wherein
   the angle of incidence is a positive value, and
   the angle of incidence is defined with respect to an intersecting line extending normally from each optical surface of the plurality of optical elements.

4. The objective lens of claim 3 wherein
   each of the optical surfaces provides an angle of reflection for the marginal rays that is substantially equal to an angle of incidence of the same marginal rays into a corresponding optical surface, and
   the angle of incidence and the angle of reflection are measured with respect to the intersecting line extending normally from the respective optical surface.

5. The objective lens of claim 1 wherein
the entrance port and the exit port are disposed at the same plane, which is oriented perpendicular to the optical axis,
the marginal rays are emitted from the exit port of an interferometer, and
the light is propagated into the entrance port of the same interferometer.

6. The objective lens of claim 1 wherein
the partially reflected marginal rays are reflected at an angle of reflection that is greater than the maximum angle for propagating light into the entrance port of the optical measuring system.

7. The objective lens of claim 1 wherein
the objective lens has a numerical aperture, and
the minimum threshold value is greater than 0.8 times an inverse sine of the numerical aperture.

8. The objective lens of claim 1 wherein
the plurality of optical elements includes first and second doublets disposed between the first and second ends, and
an air gap is sandwiched between the first and second doublets.

9. The objective lens of claim 1 wherein
the plurality of optical elements is configured to provide a conjugate image of an object at an entrance port of an interferometer.

10. The objective lens of claim 1 wherein
the plurality of optical elements is configured to (a) receive substantially collimated light at the first end, (b) transmit corresponding light from the second end to a device under test to form an image, (c) receive response light from the device under test at the second end, and (d) transmit light from the first end to form an image conjugate corresponding to the image formed at the device under test.

11. The objective lens of claim 1 including
a null lens disposed along the optical axis, at a location between the second end and a device under test, and
an interferometer configured to provide a beam of light along the optical axis toward the first end.

12. The objective lens of claim 1 wherein
an object placed at a distance near infinity, along the optical axis, provides a response light to the second end, and the plurality of optical elements is configured to provide, from the first end, a finite conjugate image of the object at an entrance port of an interferometer.

13. An optical measuring system comprising
an interferometer providing light, along an optical axis, from an exit port toward an optical device under test, and receiving light along the optical axis at an entrance port,
an objective lens and a null lens disposed along the optical axis between the interferometer and the optical device under test,
wherein the objective lens includes an objective back disposed adjacent to the exit port of the interferometer and an objective front disposed adjacent to the null lens,
the objective lens includes multiple optical surfaces arranged along the optical axis, and
marginal rays of the light provided from the exit port of the interferometer have an angle of incidence into each of the multiple optical surfaces, with respect to an intersecting line extending normally from each optical surface, that is greater than a minimum threshold value for reducing reflected marginal rays entering the entrance port of the interferometer,
wherein the minimum threshold value is approximately 8-9 degrees, and a maximum angle for propagating reflected marginal rays into the entrance port of the interferometer is approximately 2 degrees.

14. The optical measuring system of claim 13 wherein
the objective lens includes first and second doublets disposed between the objective back and the objective front, and
an air gap is sandwiched between the first and second doublets.

15. The optical measuring system of claim 14 wherein
each of the first and second doublets includes three optical surfaces.

16. The optical measuring system of claim 13 wherein
the objective lens is configured to receive a first light from the exit port of the interferometer and focus the first light at a distance away from the objective front,
the objective lens is configured to receive a second light from the optical device under test, by way of the null lens, and
the objective lens is configured to provide the received second light to the entrance port of the interferometer.

17. The optical measuring system of claim 16 wherein
the first light forms a spot image on an optical surface of the device under test, and
the second light forms a conjugate image of the spot at the entrance port of the interferometer.

18. The optical measuring system of claim 17 wherein
the spot image on the optical surface of the device under test is diffraction limited.

\* \* \* \* \*